United States Patent [19]

Seita et al.

[11] 4,056,666
[45] Nov. 1, 1977

[54] PROCESS FOR PRODUCING POLYION COMPLEX HAVING NUCLEIC ACID BASES

[75] Inventors: Toru Seita; Akihiko Shimizu; Yujiro Kosaka, all of Shin-nanyo, Japan

[73] Assignee: Toyo Soda Manufacturing Co., Ltd., Japan

[21] Appl. No.: 689,062

[22] Filed: May 24, 1976

[30] Foreign Application Priority Data

June 2, 1975 Japan .................................. 50-65426

[51] Int. Cl.$^2$ .......................... C08F 8/42; C08F 8/44
[52] U.S. Cl. ........................................ 526/29; 260/252
[58] Field of Search ......................... 526/29; 260/252

[56] References Cited

U.S. PATENT DOCUMENTS 3,969,334  7/1976  Shimizu et al. ....................... 526/29

OTHER PUBLICATIONS

SN 713648 v.s. Patent application of Seita et al.

*Primary Examiner*—William F. Hamrock
*Attorney, Agent, or Firm*—Oblon, Fisher, Spivak, McClelland & Maier

[57] ABSTRACT

A polyion complex prepared by reacting an alkali metal silicate with a nucleic acid base-containing polycation polymer having the unit formula:

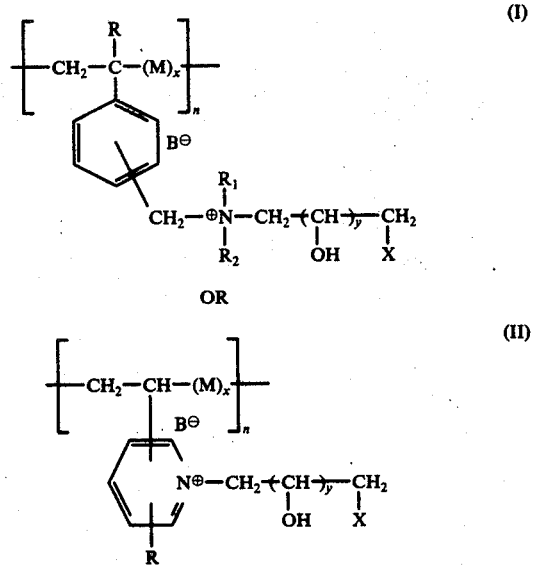

wherein
- X represents adenine, thymine, cytosine, uracil or a derivative thereof, in which the purine nucleus is bonded at 9-position and the pyrimidine nucleus is bonded at 1-position;
- M represents a vinyl monomer;
- $x$ is 0 or a positive integer;
- B represents a halogen atom or hydroxyl group; y is 0 or 1;
- R represents a hydrogen atom or a $C_{1-4}$ alkyl group;
- $R_1$ and $R_2$ respectively represents a $C_{1-10}$ hydrocarbon group and $n$ is an integer greater than 10.

5 Claims, No Drawings

PROCESS FOR PRODUCING POLYION COMPLEX HAVING NUCLEIC ACID BASES

BACKGROUND OF THE INVENTION

1. Field of the Invention

The present invention relates to a process for producing a polyion complex using an alkali metal silicate, such as water glass, as a polyanion and a nucleic acid base-containing polycation polymer.

2. Description of the Prior Art

Previously, in processes for producing polyion complexes, combinations of two organic compounds, such as a combination of sodium polyacrylate or sodium polystyrene-sulfonate with polyvinylbenzyltrimethyl ammonium salt have been used. However, the polyion complexes of a combination of an organic compound with an inorganic compound may have different properties when compared with polyion complexes of two organic compounds.

Accordingly, there exists a need for a process capable of preparing polyion complexes containing both an organic and an inorganic compound.

SUMMARY OF THE INVENTION

It is an object of the present invention to provide a process for producing novel polyion complexes which are useful as resins for separation and purification of nucleic acid components such as protein, nucleic acid base, nucleoside, etc., and derivatives thereof.

This and other objects of the invention have been attained by producing a novel polyion complex by reacting an alkali metal silicate with a nucleic acid base-containing polycation polymer.

DETAILED DESCRIPTION OF THE EMBODIMENTS

The polyion complexes produced by the process of the present invention have the following characteristics:

1. The polyion complexes of the invention contain nucleic acid bases which have special biochemical characteristics. The synergistic effect of the bases and hydrogen bonding between adenine thymine (uracil) and guanine ⇌ cytosine can be effectively utilized by the polyion complexes for separation of these compounds.

2. The polyion complexes of the invention are a combination of an organic compound and an inorganic compound which has a low degree of swelling are effective as resins.

3. In certain structures, they have a secondary hydroxyl group which may be used to impart cross-linking by conventional techniques.

The present invention provides a process for producing novel polyion complexes by complexing an alkali metal silicate with the nucleic acid base-containing polycation polymer. The polyanion used as one component in the polyion complex of the invention is an alkali metal silicate, such as water glass. The polycation polymer used as the other component in the polyion complex has the unit formula (I) or (II).

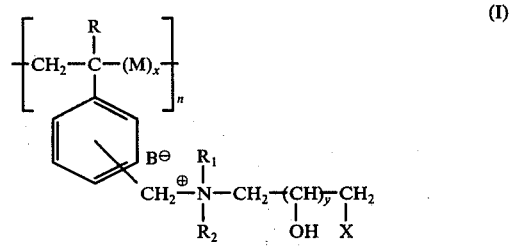

wherein X represents adenine, thymine, cytosine, uracil or a derivative thereof in which the purine nucleus is bonded at the 9-position and the pyrimidine nucleus is bonded at the 1-position; M represents a vinyl monomer; $x$ is 0 or a positive integer; B represents a halogen atom or hydroxyl group; $y$ is 0 or 1; R represents a hydrogen atom or a $C_{1-4}$ alkyl group; $R_1$ and $R_2$ respectively represent a $C_{1-10}$ hydrocarbon group and $n$ is an integer greater than 10. In formula (I), $R_1$ and $R_2$ are respectively a $C_{1-10}$ hydrocarbon group, preferably a $C_{1-4}$ alkyl group, such as methyl, ethyl, propyl and butyl groups. M is an aliphatic or aromatic vinyl monomer such as styrene; substituted styrene, e.g. α-methyl styrene; acrylonitrile; substituted acrylonitrile, e.g. methacrylonitrile, vinyl acetate, acrylic acid, methacrylic acid and the like, except that it should not form an electrolyte polymer.

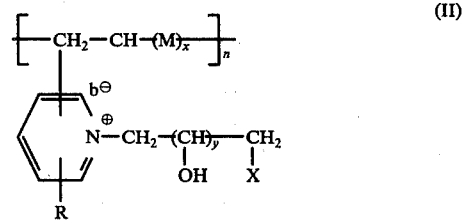

wherein X represents adenine, thymine, cytosine, uracil or a derivative thereof in which the purine nucleus is bonded at the 9-position and the pyrimidine nucleus is bonded at the 1-position; M represents a vinyl monomer; $x$ is 0 or a positive integer; B represents a halogen atom or hydroxyl group; $y$ is 0 or 1; R represents a hydrogen atom or a $C_{1-4}$ alkyl group; $n$ is an integer greater than 10. In the formula, M is an aliphatic or aromatic vinyl monomer such as styrene; substituted styrene, e.g. α-methyl styrene; acrylonitrile; substituted acrylonitrile, e.g. methacrylonitrile, vinyl acetate, acrylic acid, methacrylic acid and the like except that it should not form an electrolyte polymer.

One process for producing the novel polyion complexes of the present invention involves simply mixing an aqueous solution of an alkali metal silicate with the nucleic acid base-containing polycation polymer. The nucleic acid base-containing polycation polymer can be dissolved in water, water miscible organic solvent or a mixture thereof. Suitable organic solvents include methanol, ethanol, butanol, acetone, tetrahydrofuran, N,N'-dimethyformamide and the like. The solvent for the alkali metal silicate can be water or said water miscible organic solvent. The order of the addition is not critical and one can add the solution of the polycation polymer to the solution of alkali metal silicate or add the latter to the former.

It is also possible to add a solid of one component to a solution of the other component. However, the resulting polyion complex does not have a uniform composition and has low reproducible properties. Accordingly, this is not the preferred method.

The concentration of the polycation polymer and the alkali metal silicate in the solutions can each be in each range of 0.1 to 80 wt.% preferably 1 to 50 wt.%. The temperature for mixing both solutions can be in a range of 0° to 90° C, preferably from room temperature to 50° C. The equivalent ratio of the polycation polymer to the alkali metal silicate is in the range of 0.05 to 20.

The polyion complexes produced by the process of the invention are novel compounds which are white solids.

Having generally described the invention, a more complete understanding can be obtained by reference to certain specific examples, which are included for purposes of illustration only and are not intended to be limiting unless otherwise specified.

EXAMPLE 1

In a 2 liter beaker, 9.7 g of the polycation polymer having the unit formula:

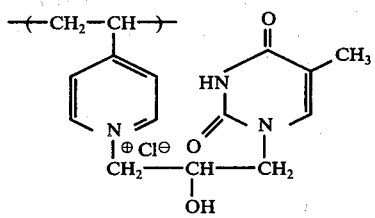

which was produced by heating a mixture of poly-4-vinylpyridine (MW $1 \times 10^5$) and 1-(2'-hydroxy-3'-chloropropyl)-thymine in N,N-dimethylformamide (72% of quaternary degree) was dissolved in 500 ml of distilled water with stirring. In a 500 ml beaker, 12 g of sodium silicate was charged and dissolved in 300 ml of distilled water with stirring. The aqueous solution of sodium silicate was added dropwise to the aqueous solution of the polycation polymer at room temperature, and the mixture was further stirred for 3 hours. After one day, the precipitate was collected by a filtration, washed with large amount of water, then washed with acetone and dried under a reduced pressure to obtain the polyion complex in white solid form. According to the infrared spectrum analysis of the polyion complex, the bands of the secondary hydroxyl group at 3520 cm$^{-1}$; thymine at 1650 cm$^{-1}$ and ether bond between Si-O at 1050 to 750 cm$^{-1}$ were found

EXAMPLE 2

In a 2 liter beaker, 18.2 g of polycation polymer having the unit formula:

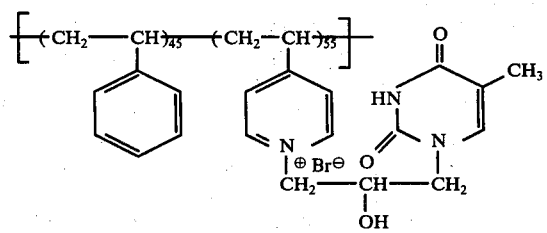

which was produced by heating a mixture of styrene-4-vinyl-pyridine copolymer (MW $4 \times 10^{-6}$) and 1-(2'-hydroxy-3'-bromopropyl)-thymine in N,N'-dimethylformamide (62% of quaternary degree) was dissolved in 700 ml of distilled water with stirring. An aqueous solution of sodium silicate was prepared, added dropwise to the aqueous solution of the polycation polymer and the mixture was treated in accordance with the process of Example 1. The polyion complex in white solid form was obtained. According to the infrared spectrum analysis of the polyion complex, the bands of the secondary hydroxyl group at 3520 cm$^{-1}$; thymine at 1650 cm$^{-1}$; styrene at 760 cm$^{-1}$ and 695 cm$^{-1}$ and ether bond between Si-O at 1050 to 750 cm$^{-1}$ were found.

EXAMPLE 3

In a 2 liter beaker, 9.3 g of polycation polymer having the unit formula:

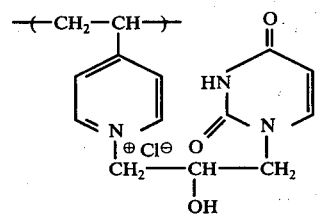

which was produced by heating a mixture of poly-4-vinylpridine (MW $1 \times 10^5$) and 1-(2'-hydroxy-3'-chloropropyl)-uracil in N,N'-dimethylformamide (51% of quaternary degree) was dissolved in 500 ml of distilled water with stirring. An aqueous solution of sodium silicate was prepared, added dropwise to the aqueous solution of the polycation polymer and the mixture was treated in accordance with the process of Example 1. The polyion complex in white solid form was obtained.

EXAMPLE 4

In accordance with the process of Example 1, 9.7 g of polycation polymer having the unit formula:

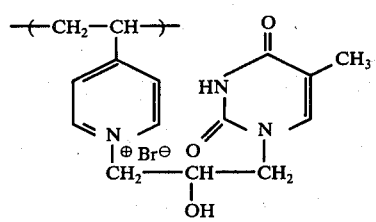

which was produced by heating a mixture of poly-4-vinylpridine (MW $1 \times 10^5$) and 1-(2'-hydroxy-3'-bromopropyl)-thiymine in N,N'-dimethylformamide (85% of quaternary degree) was dissolved in 500 ml of distilled water with stirring and then the aqueous solution of sodium silicate of Example 1 was added and the mixture was treated. The polyion complex in white solid form was obtained.

EXAMPLE 5

In accordance with the process of Example 1, 8.5 g of polycation polymer having the unit formula:

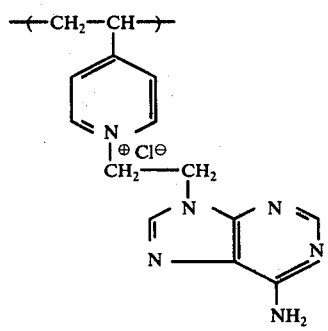

which was produced by heating a mixture of poly-4-vinylpyridine (MW 1 × 10⁵) and 9-(2'-chloroethyl)-adenine in N,N'-dimethyl-formamide (90% of quaternary degree) was dissolved in 500 ml of distilled water and then the aqueous solution of sodium silicate of Example 1 was added and the mixture was treated. The polyion complex in white solid form was obtained.

EXAMPLE 6

In accordance with the process of Example 1, 11.4 g of polycation polymer having the unit formula:

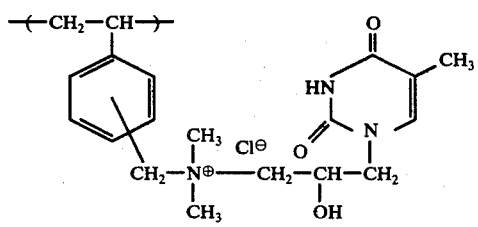

which was produced by heating a mixture of polyvinylbenzyldimethylamine (MW 4 × 10⁵) and 1-(2'-hydroxy-3'-chloropropyl)-thymine in N,N-dimethylformamide (68% of quaternary degree) in 500 ml of water, and then the aqueous solution of sodium silicate of Example 1 was added and the mixture was treated. The polyion complex in white solid form was obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a polyion complex which comprises reacting an alkali metal silicate with a nucleic acid base-containing polycation polymer having the unit formula:

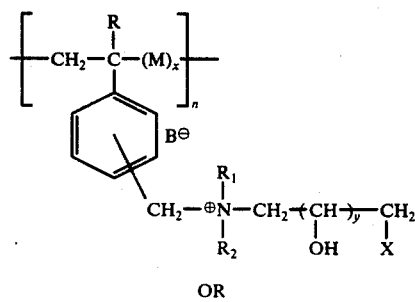

OR

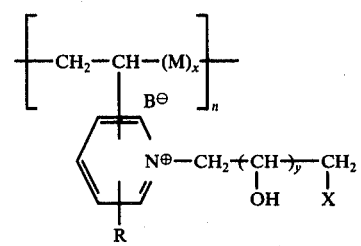

wherein X represents adenine, thymine, cytosine, uracil or a derivative thereof, in which the purine nucleus is bonded at 9-position and the pyrimidine nucleus is bonded at 1-position; M represents a vinyl monomer; $x$ is 0 or a positive integer; B represents a halogen atom or hydroxyl group; $Y$ is 0 or 1; R represents a hydrogen atom or a $C_{1-4}$ alkyl group; $R_1$ and $R_2$ respectively represent a $C_{1-10}$ hydrocarbon group and $n$ is an integer greater than 10.

2. The process of claim 1, wherein the alkali metal silicate is dissolved in water, a water miscible solvent or a mixture thereof; and the polycation polymer is dissolved in water, a water miscible solvent or a mixture thereof and both solutions are then admixed and the precipitate is collected.

3. The process of claim 2, wherein the solvent is water, methanol, ethanol, butanol, acetone, tetrahydrofuran or N,N-dimethylformamide.

4. The process of claim 1, wherein the ratio of the polycation polymer to the alkali metal silicate is in the range of 0.05 to 20.

5. The polymer prepared by the process which comprises reacting an alkali metal silicate with a nucleic acid base-containing polycation polymer having the unit formula:

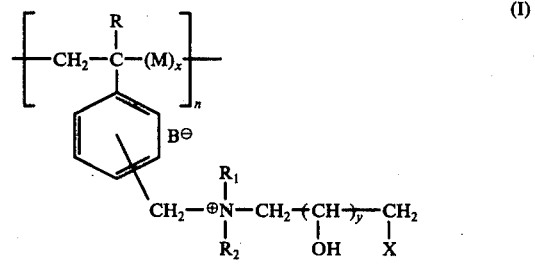

OR

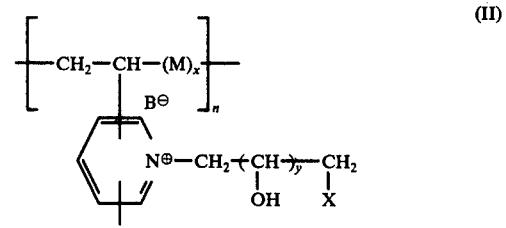

wherein X represents adenine, thymine, cytosine, uracil or a derivative thereof, in which the purine nucleus is bonded at 9-position and the pyrimidine nucleus is bonded at 1-position; M represents a vinyl monomer; $x$ is 0 or a positive integer; B represents a halogen atom or hydroxyl group; $y$ is 0 or 1; R represents a hydrogen atom or a $C_{1-4}$ alkyl group; $R_1$ and $R_2$ respectively represent a $C_{1-10}$ hydrocarbon group and $n$ is an integer greater than 10.

* * * * *